Patented Aug. 10, 1926.

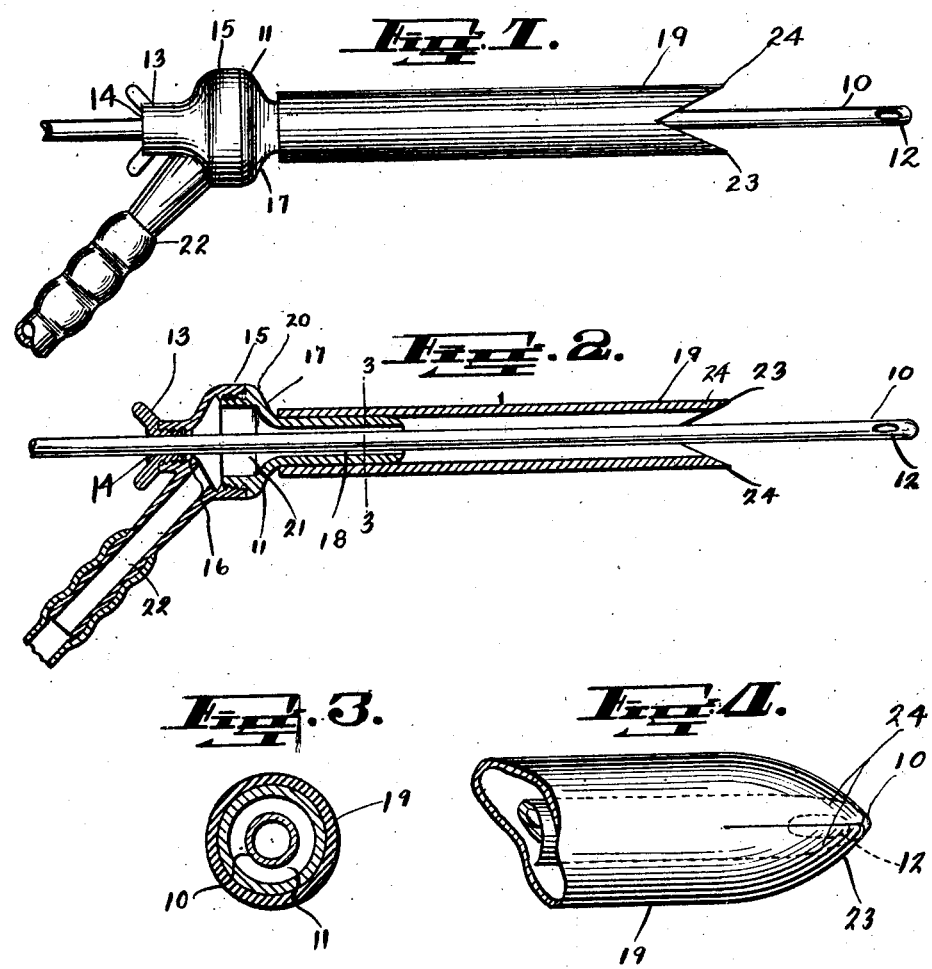

1,595,180

UNITED STATES PATENT OFFICE.

ARTHUR R. FISHER, OF NEW YORK, N. Y.

IRRIGATOR.

Application filed December 27, 1922. Serial No. 609,253.

This invention relates to irrigators and more particularly to the type of irrigator shown in U. S. Patent No. 1,211,928, of January 9, 1917, granted to me.

Some of the objects of the present invention are: to eliminate from instrumentalities of the character mentioned irregularities, indentations, projections, and so forth, which in the use of an instrumentality allow tissues or membranes to cling thereto which easily results in injury to such tissues or membranes; to make use of a flexible insert tube of soft material which is detachable, which has a smooth regular external surface, and which has a divided or split entrant end; and with these and other objects in view the invention resides in the particular provision, construction and relative disposition of parts hereinafter fully described and illustrated in the accompanying drawing, in which:—

Figure 1 is a side elevation.

Figure 2 is a central longitudinal sectional view.

Figure 3 is a transverse sectional view taken on the line 3—3, Figure 2.

Figure 4 is a detail view illustrating how the entrant end of the insert tube yields and responds when inserted.

Referring now more particularly to the several views of the drawing for all of the details of the present invention, it will be apparent that use is made of an applicator tube 10, and a supporting guide and drain 11 for the tube 10. The tube 10 is in the nature of a soft rubber element having outlet apertures 12 at one end thereof, and the said tube is movable through the part 11.

The supporting guide and drain 11 in the present instance is made up of four parts which are separable to facilitate the cleaning thereof to the point of making it hygienic. As stated there are four parts; a part 13 having a bore 14 therein substantially equal to the diameter of the tube 10; a part 15 having a bore 16 therein equal to the bore 14; a part 17 having a nipple 18 having an internal diameter greater than the diameter of the tube 10; and an insert tube 19 which is substantially uniform diameter throughout its length, which is made of soft rubber so as to be flexible, and which is capable of being slid onto and off the nipple 18. The internal diameter of the tube 19 is larger than the external diameter of the tube 10. The part 13 has a screw threaded end which is screwed into a screw threaded bore in the part 15; the part 15 also has a screw threaded bore into which is screwed the screw threaded end of the part 17. The parts 15 and 17 as formed are enlarged to provide a guard 20 and a comparatively large chamber 21 at the discharge duct 22 formed on the part 15 to which a discharge tube may be connected.

Instrumentalities of the character of the present one hitherto produced though capable of the desired utility are imperfect in that each possesses in the part thereof which is inserted in the rectum, for instance, an eye through which the waste flow passes. The formation of such eye necessarily results in a depression or indentation in which portions of a tissue or membranes dispose themselves usually causing pain to a patient, and sometimes causing injury. It is necessary to have such a thing as an eye or aperture for the return flow, or a substitute for such an eye, and such a substitute is embodied by the insert tube 19. The substitute resides in splitting one end of the tube 19— the entrant end 23. The end 23 may be split or cut to provide furcations 24, which by virtue of their inherent flexibility and the split or cut, allows the entrant end 23 to be reduced on insertion, and when properly located, the furcations 24 assume a normal relation to each other and to the remainder of the tube of which they form parts.

From the foregoing it should be manifest that in the use of this irrigator the insert tube may be inserted without possibility of membrane or tissue portions being injured; that entrance of the waste flow to the drain passage of the irrigator is through the extreme end of the tube 19 between the furcations 24 and the tube 10; that a drain passage is formed because of the different diameters of the several parts; that the applicator tube 10 may be moved longitudinally; and that the construction of the irrigator is improved from the view point of sanitation.

What is claimed as new is:—

1. An irrigator of the return flow type characterized by a detachable insert-tube having a bifurcated entrant end by virtue of V-shaped cuts therein to provide flexible furcations, the walls of which are adapted to be brought into meeting engagement upon and during insertion into a constricted opening, and an applicator tube mounted for longitudinal movement in said insert tube.

2. An irrigator comprising a supporting structure, a nipple formed thereon for removably supporting a yieldable insert tube of a smooth and regular surface having a compressible insert end, an applicator tube having its bearing in said supporting structure and movable in said insert tube.

3. An irrigator comprising a supporting structure, a nipple formed thereon for removably supporting a yieldable insert tube of a smooth and regular surface, an applicator tube having its bearing in said supporting structure and movable in said insert tube, and V-shaped cuts formed in the free end of said insert tube to form furcations which are adapted to be compressed to reduce the end of the tube upon insertion.

4. An irrigator comprising a supporting structure, a nipple formed thereto for removably supporting a yieldable insert-tube of a smooth and regular surface, an applicator tube having its bearing in said supporting structure and movable longitudinally in said insert-tube, V-shaped cuts formed on the free end of said insert-tube to form furcations which are adapted to be compressed to reduce the end of the tube, the walls of said furcations adapted to be brought together for insertion and adapted to be held in engagement during insertion into a constricted passage.

5. A colon irrigator comprising an inner tube, and a flexible outer tube of increased diameter surrounding the inner tube, the end of the outer tube being open to permit the entrance of drainage therein and constructed to permit a reduction in size thereof to facilitate insertion and to permit expansion of the open end after insertion.

In testimony whereof I have affixed my signature.

ARTHUR R. FISHER.